United States Patent
Wang

(10) Patent No.: US 11,736,576 B2
(45) Date of Patent: *Aug. 22, 2023

(54) METHOD AND SYSTEM FOR GENERATING BEHAVIOR PROFILES FOR DEVICE MEMBERS OF A NETWORK

(71) Applicant: BEET, Inc., Northville, MI (US)

(72) Inventor: David Jingqiu Wang, Northville, MI (US)

(73) Assignee: BEET, INC., Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/456,141

(22) Filed: Nov. 22, 2021

(65) Prior Publication Data

US 2022/0086255 A1    Mar. 17, 2022

Related U.S. Application Data

(63) Continuation of application No. 16/909,468, filed on Jun. 23, 2020, now Pat. No. 11,201,943, which is a continuation of application No. 16/169,669, filed on Oct. 24, 2018, now Pat. No. 10,735,551, which is a continuation of application No. 14/947,491, filed on Nov. 20, 2015, now Pat. No. 10,122,818, which is a continuation of application No. 13/354,044, filed on Jan. 19, 2012, now Pat. No. 9,218,628.

(60) Provisional application No. 61/435,468, filed on Jan. 24, 2011, provisional application No. 61/435,464, (Continued)

(51) Int. Cl.
*H04L 67/303* (2022.01)
*H04L 67/12* (2022.01)
*G06Q 50/00* (2012.01)
*H04L 67/10* (2022.01)

(52) U.S. Cl.
CPC .......... *H04L 67/303* (2013.01); *G06Q 50/01* (2013.01); *H04L 67/10* (2013.01); *H04L 67/12* (2013.01)

(58) Field of Classification Search
CPC ....... H04L 67/303; H04L 67/10; H04L 67/12; G06Q 50/01
See application file for complete search history.

(56) References Cited

U.S. PATENT DOCUMENTS

| | | | |
|---|---|---|---|
| 9,218,628 B2 * | 12/2015 | Wang | G06Q 50/01 |
| 10,122,818 B2 * | 11/2018 | Wang | H04L 67/10 |
| 10,735,551 B2 * | 8/2020 | Wang | G06Q 50/01 |

(Continued)

*Primary Examiner* — Dhairya A Patel

(57) ABSTRACT

A method and system for generating a digital profile defined by digital behavior expressed by a device includes receiving digital behavior data and identifying information defined by a device in communication with a content server, generating a device profile for the device, associating the device with at least one device population, and generating a population profile defined by the device population. The device profiles and population profiles may be made accessible to users of a social network. Related contents, including identifying information, device behavior analysis, comparative ratings, service and diagnostic information, messages and alerts may be associated with a device profile or population profile and published to the social network. A population profile may define normal digital behavior of the population, such that the population profile may be compared with the device profile of a device, to determine whether the device operation is abnormal with respect to the population profile.

8 Claims, 3 Drawing Sheets

Related U.S. Application Data filed on Jan. 24, 2011, provisional application No. 61/435,460, filed on Jan. 24, 2011.

(56) References Cited

U.S. PATENT DOCUMENTS

| | | | |
|---|---|---|---|
| 10,944,745 B2* | 3/2021 | Kursun | H04L 63/102 |
| 11,201,943 B2* | 12/2021 | Wang | H04L 67/303 |
| 11,568,006 B1* | 1/2023 | Brannan | G06Q 30/0645 |
| 2007/0112775 A1* | 5/2007 | Ackerman | H04N 21/4415 |
| | | | 707/999.009 |
| 2008/0239367 A1* | 10/2008 | Podl | H04N 1/00832 |
| | | | 358/1.15 |
| 2009/0296606 A1* | 12/2009 | Ravikumar | H04L 45/00 |
| | | | 709/228 |
| 2010/0151817 A1* | 6/2010 | Lidstrom | H04L 67/535 |
| | | | 455/466 |
| 2010/0246421 A1* | 9/2010 | Marshall | H04L 12/2801 |
| | | | 370/252 |
| 2012/0123995 A1* | 5/2012 | Boot | H02J 3/14 |
| | | | 706/54 |
| 2012/0215369 A1* | 8/2012 | Desai | G06Q 50/06 |
| | | | 700/291 |
| 2023/0037852 A1* | 2/2023 | Islam | H04L 5/0094 |

* cited by examiner

METHOD AND SYSTEM FOR GENERATING BEHAVIOR PROFILES FOR DEVICE MEMBERS OF A NETWORK

CROSS REFERENCES TO RELATED APPLICATIONS

This Application claims the benefit of U.S. patent application Ser. No. 16/909,468 filed Jun. 23, 2020, U.S. patent application Ser. No. 16/169,669 filed Oct. 24, 2018 and issued as U.S. Pat. No. 10,735,551 on Aug. 4, 2020, U.S. patent application Ser. No. 14/947,491 filed Nov. 20, 2015 and issued as U.S. Pat. No. 10,122,818 on Nov. 6, 2018, U.S. patent application Ser. No. 13/354,044 filed Jan. 19, 2012 and issued as U.S. Pat. No. 9,218,628 on Dec. 22, 2015, and U.S. Provisional Applications 61/435,460, 61/435,464, and 61/435,468, filed Jan. 24, 2011, which are each hereby incorporated by reference in their entirety.

TECHNICAL FIELD

The present invention relates generally to device networking, and more particularly to a method and a system for generating device profiles for device members of a network, and applying social networking principles to a device network.

BACKGROUND

As the world becomes increasingly connected through the advancement of technology, the creation and expansion of social networks like Twitter or Facebook has dramatically expanded. These social networks, as currently used, provide and display profiles of individual human users through which the human user may communicate, e.g., may express his/her voice. Each human user profile is generated by the human user taking an action to document the human user's characteristics or personalized descriptors, communicate the human user's opinions, and/or publish the human user's behaviors on the World Wide Web, by posting, for example, a series of Tweets or Wall-posts which are descriptive of his/her human actions, characteristics and behaviors to the human user's profile within the social network. The social network provides a means for human users to affiliate themselves with one or more groups which may share a common characteristic with the human user, such as a human relationship, a location, a school, an employer, a hobby or interest, an organizational affiliation, etc. These groups provide a forum through which the group members may aggregate and share information related to the group, including providing input to a human user profile or a group profile.

There are millions of industrial devices such as clamps, pins, robots, welders, weld timers, conveyors and other devices performing repetitive functions in factories and millions of electronic appliances and devices functioning in homes, apartments, offices and other locations across the world. Each of these devices produces a digital voice during operation, which may be, for example, an output signal, a power consumption pattern or other recordable operating parameter or digital expression of the device's behavior. Each of these devices and appliances performs their jobs in their respective location in isolation and independently of each other, e.g., with a silenced, e.g., non-shared, digital voice.

SUMMARY

A system and method for generating a device profile defined by digital behavior expressed by a device is provided. In one example, the device profile may be one of a plurality of device profiles provided to a device network and made accessible by a user of a device network. The device profile may be associated with a population of devices identified from the plurality of device profiles, and a population profile may be defined by the device profiles of the devices associated with the population. The population profile may be configured to define normal digital behavior and/or a normal operating range of the population, such that the population profile may be compared with the device profile of a device, to determine whether the device operation is atypical of or abnormal with respect to the population profile. The system and method may be configured to alert the device or a user of the device to provide notification that abnormal digital behavior of the device has been identified.

The system and method may be configured to compare a first population of devices to at least a second population of devices, where the devices of the first population may be dissimilar but comparable to the devices of the second population, to provide a relative comparison of the first and second populations. A digital profile may be defined for a location, where the location profile represents the power consumption pattern of a group of co-located devices, which may include dissimilar devices. By way of non-limiting example, a location may be defined as a machine, a grouping of devices performing a process, such as a manufacturing cell, devices co-located in a facility or dwelling, which may be a household, wherein the co-located devices, which may be dissimilar devices, share a common or combined power source.

The system and method includes receiving digital behavior data and identifying information from one or more respective devices of a plurality of devices in communication with a content server, associating the digital behavior data and identifying information received from the respective device with the respective device, and generating a device profile for the respective device defined by the digital behavior data associated with the respective device. The system and method may further include identifying a plurality of device populations, wherein each respective device population is defined by at least one respective element of the identifying information, populating the respective device population with one or more respective devices associated with the at least one respective element of the identifying information, and generating a population profile for the respective device population defined by the respective device profiles of the respective devices populating the respective device population. A plurality of device profiles defined by the respective devices of the plurality of devices and a plurality of population profiles defined by the respective plurality of device populations may be stored using the content server. The content server may be configured to be in communication with a network and to provide the device profiles and the population profiles to the network, which may include providing the profiles to a device network in communication with the network, such that the device and population profiles are accessible by users of the device network.

The system and method may be configured to provide related content, e.g., content related to, defined by, or affiliated with a device and/or a population and to associate the related content with one or more device profiles and/or population profiles. The related content may be provided to the device network and published for viewing by a user of the device network. Related content may include identifying information, device behavior analysis, comparative ratings, service and diagnostic information, messages and alerts, and may include content posted to the device network by a user or member of the device network, which may include a device in communication with the device network.

The above features and other features and advantages of the present invention are readily apparent from the following detailed description of the best modes for carrying out the invention when taken in connection with the accompanying drawings.

DETAILED DESCRIPTION

Figure 1:
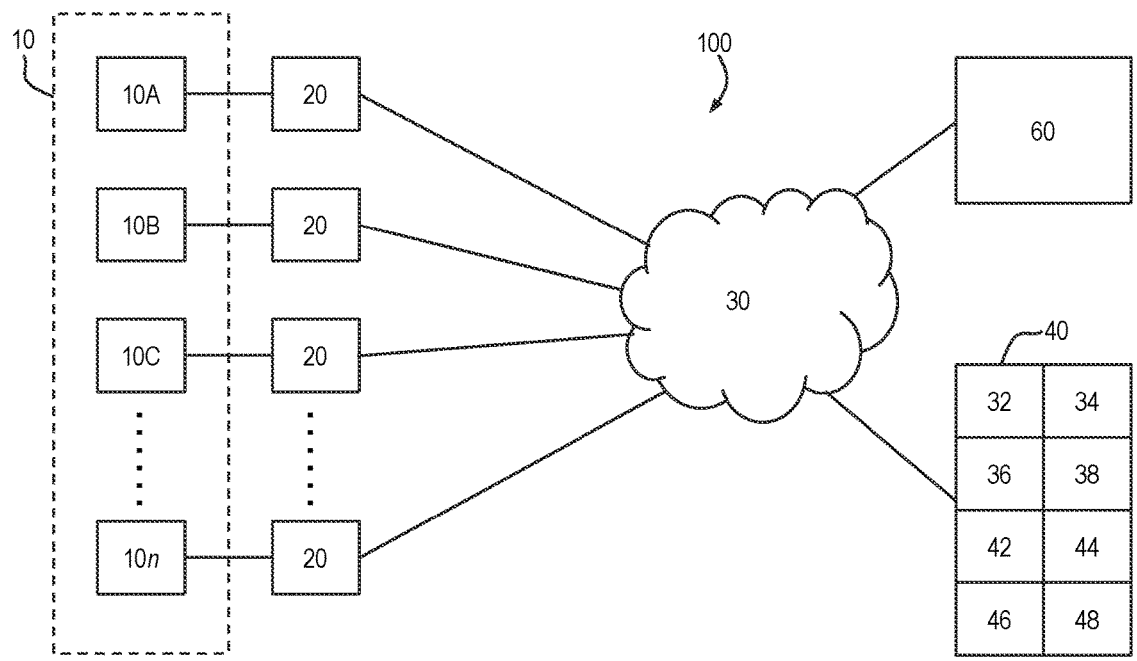
FIG. 1 is a schematic illustration of a system for generating behavior profiles including device population profiles defined by device members of an internet-based device network and providing device population-related content.
Figure 2:
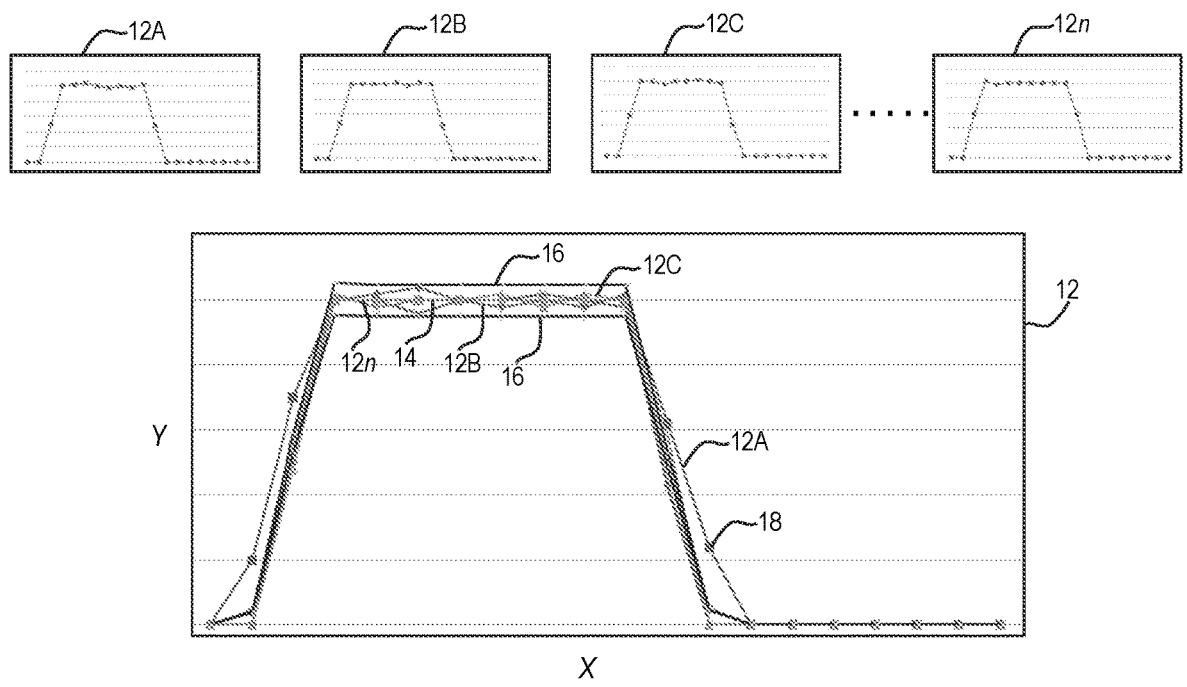
FIG. 2 is a schematic illustration of device behavior profiles provided by device members and a population behavior profile generated by the system of FIG. 1.

Referring to the drawings, wherein like reference numbers correspond to like or similar components throughout the several figures, there is shown in FIG. 1 a system generally indicated at 100 for generating behavior profiles shown in FIG. 2, including device behavior profiles 12A . . . 12n each defined by a respective device 10A . . . 10n, and a population behavior profile 12 (see FIG. 2), wherein the plurality of devices 10A . . . 10n comprises a device population 10 defining the device population profile 12, and the plurality of devices 10A . . . 10n are device members of an internet-based device network 60. The term "device 10x" is used hereinafter to refer to one of the devices 10A . . . 10n, and the term "device profile 12x" is used hereinafter to refer to the particular device profile 12x provided or defined by the device 10x, wherein device profile 12x is one of the device profiles 12A . . . 12n of FIG. 2.

The device network 60 may be configured to communicate with a network 30. The network 30 may be, for example, configured as the Internet, the World Wide Web, etc. The system 100 may be configured to generate, publish and/or provide population-related content (not shown) and/or device-related content (not shown) to device members and device user members of the device network 60, such that the device network 60 may apply, emulate, or incorporate, in part, the principles of social networking and/or the features of a social network. The information generated by the system 100, including behavior profiles, population-related content, and device-related content may be accessed via the network 30 through a device network website (not shown) by a device member of the device population 10, and/or by users of the device population 10. The device network website may be provided by the device network 60 including content provided by a content server 40 in communication with the device network 60, for example, via the network 30.

The content server 40 may be configured to communicate with the network 30 through a network interface 32 which may be a modem, website or similar means. The content server 40 may include one or more applications 38 adaptable to process the profile data received from the device population 10, and a memory 34 and central processing unit (CPU) 36 for executing the applications 38. Processing the profile data may include, by non-limiting example, identifying a device in communication with the content server 40, storing behavior profile data received from the device, associating the device and/or device profile data with at least one population, associating related content with a device or population, aggregating the profile data with other profile data, associated population data and/or related content, analyzing the profile data and population data, identifying abnormalities or atypical data in the profile or population profiles, generating quality, durability and failure predictions for the device or population, comparing one device population to another to provide a quality, durability, or satisfaction rating of each population, comparing device profiles, comparing population profiles, ranking or rating a device or population, generating and providing a message related to the device and/or population which may be a rating, an advisory, an alert, etc., and/or publishing the device profile, population profile and/or related content for access by a device or device user. The memory 34, at least some of which is tangible and non-transitory, can include, by way of example, ROM, RAM, EEPROM, etc., of a size and speed sufficient for executing the applications 38 through the network 30, storing databases 42, 44, 46, and operating a publisher 48.

The content server 40 may include one or more databases configured to receive, store and/or provide data within the system 100. For example, the content server 40 may include a device database 42 for receiving, storing and providing device behavior profiles such as the device profiles 12A . . . 12n shown in FIG. 2, where the device profiles may be defined by and/or include device outputs such as measurable or recordable device operating parameters, power consumption patterns, digital signals, cycle times, or other digital expressions of the device behavior, e.g., digital behavior data. The device database 42 may include device related content, including device identification information such as a device type, make, model, age, time in service, location, operating environment, etc. for each device 10x, and the device identification information may be used to register or identify the device 10x as a member of the device network 60, and/or to associate or affiliate the device 10x with a device population 10 and/or other populations with shared or comparable identifiers, where the population 10 and/or other populations may each represent a group identified within the device network 60, and the affiliated device 10x may be considered a group member. The content server 40 may include a population database 44 for receiving, storing and providing population behavior profiles such as the device population profile 12 shown in FIG. 2, and population identification information which may be used to associate or affiliate the population 10 with the population devices 10A . . . 10n, or with another population, for example, for comparison of the behavior profiles of the two populations. The content server 40 may include a related content database 46 for receiving, storing and providing content related to a device or a device population, which may include, for example, non-digital information, such as device user comments, customer satisfaction ratings, warranty information, diagnostic or service information, etc.

The publisher 48 may be configured to publish content from the content server 40 to the device network 60, for access by the devices 10A ... 10n, where each device 10x of the device population 10 may be a member of the device network 60 and may be a group member of one or more groups, such as the population 10. The content provided from the content server 40 to the device network 60 may be viewable by or accessible to other members or users of the device network 60, which may include human members having an interest in the device population 10 including device users, consumers, developers, manufacturers, suppliers, service providers, or others having an interest in the device population 10, comparable or competitive devices, or locations or systems incorporating a device such as the device 10x or a comparable device. Content published by the publisher 48 to the device network 60 may include device profiles, population profiles, analytical results, comparative ratings and rankings of competitive device populations, warranty, durability and quality information, service information, user and member comments and posts, alerts, warnings, etc. The publisher 48 may be configured to format the content in a predetermined presentation format. For example, each device population, such as the population 10, may be displayed using a standardized arrangement of information, which may include identifying information such as the name, brand, make, model and manufacturer of the devices 10A ... 10n comprising the population 10, the population profile 12, links to each of the device profiles 12A ... 12n and device specific information such as the location, operating environment and time in service of each of the devices 12A ... 12n, quality ratings, reliability projections, service information, manufacturer information, a device user blog or wall for posting or viewing user comments, etc.

The publisher 48 and/or the content server 40 may be configured to generate and/or provide messages to members of the device network 60, device users, and/or to a device 10x in communication with the content server 40 and/or the device network 60. For example, the publisher 48 may be configured to provide an alert message to the device 10x notifying the device 10x that the device profile 12x includes atypical data which may indicate a need for correction, maintenance or other service of the device 10x. In another example, the publisher 48 and/or the content server 40 may be configured to provide a message as an electronic signal which may be a command to the device 10x to modify or terminate operation to prevent a future condition, such as an overload or failure event. The publisher 48 and/or the content server 40 may be configured to provide a message using the device network 60, where the message may be configured as an alert, a blog post, a Tweet, a Wall-post or other message, for which notification may be provided by the device network 60 to one or more members or users of the device network 60.

The examples provided herein are non-limiting. For example, it would be understood that the functions of the content server 40 may be provided by a single server, or may be distributed among multiple servers, including third party servers, and that the data within the system 100 may be provided by databases configured other than as described for the databases 42, 44, 46. For example, the device and population profiles may reside in a shared database, and the device and population affiliation data and related content may reside in another database. The databases may be distributed among multiple servers, including third party servers, in communication with each other and the content server 40 through the network 30 and/or directly.

The device network 60 may be configured such that behaviors of each of the devices 10x or their affiliated populations 10 can be shared and accumulated through the networking system 100. A device group (not shown) may be created, for example, on the device network 60 for a certain industrial device type to collect behavior information, e.g. the digital voices or profiles of each of the devices 10x in the device group. The device group may consist of one or more device populations, such that a device 10x may be a member of the device group and a member of at least one of the device populations. For example, a device 10x may be a member of a particular device population 10 comprising devices of the same type, make, model and manufacturer of device 10x, and the device 10x may be a member of another population (not shown) comprising devices of the same type as the device 10x but including devices of various makes, models and manufacturers. A device member 10x may join the device network 60, e.g., may be configured, for example, to be in communication with the device network 60 and/or the content server 40 such that the device member 10x can contribute its digital voice, e.g., provide device profile data and device related content including identifying data, to the device group defined by the device network 60.

As member device profiles and related content are accumulated from a plurality of devices 10A ... 10n, and the profile information and related content is received, affiliated, aggregated, analyzed and/or stored via the content server 40 and/or the device network 60, a digital profile for a member group or device population may be provided. Aggregation, correlation and analysis of the behavior profiles and related content may provide failure predictions, comparisons of one population to another, quality, durability, or satisfaction rating of each population, etc. The content server 40 and/or device network 60 may be configured to provide other information, such as a warning or notification system to allow a device user to replace the device 10x before it ultimately fails, thus avoiding user inconvenience, downtime, etc. By comparing one population of items or devices to another, for example, where the first population 10 is comprised of devices 10A ... 10n of a first model or type, and the second population (not shown) is comprised of a similar device, such as a device 70A (see FIG. 4B) of a second model or type, the two populations may be compared to provide a relative comparison of quality, performance, and/or durability. The digital performance of each population, e.g., the population profile 12 created for each population and provided to the device network 60, may be further configured to include or reference other, non-digital, information, such as user comments, customer satisfaction ratings, diagnostic or service information, etc.

As shown in FIG. 1, each of the devices 10A ... 10n may be in communication with a data transfer mechanism 20 configured to collect and/or transfer the digital voice, e.g., the digital profile, of the device 10x to the content server 40. The data transfer mechanism 20 may be in communication with the network 30 to transfer the device profiles 12A ... 12n to the content server 40 or to the device network 60 in communication with the content server 40. The data transfer mechanism 20 may be configured as a data transfer application, which may be, for example, provided to a central computing and controlling device such as a programmable logic controller (PLC) in communication with and/or configured to control the device $10x$, such that device profile data may be collected by the PLC and transferred using the data transfer mechanism 20 to the content server 40 and/or device network 60.

The data transfer mechanism 20 may be configured as a data transfer member which may be interposed between and in communication with the device $10x$ and the content server 40 and/or device network 60. In one example, the data transfer mechanism 20 may be configured as a data transfer member 50 shown in FIGS. 4A, 4B and 6 and described further herein.

A device $10x$ may be any type of industrial device, consumer device, household appliance, or other device capable of producing a digital voice during operation, which may be, for example, an output signal, a power consumption pattern or other recordable operating parameter or digital expression of the device's behavior. Non-limiting examples of a device include a clamp, a pin, a weld gun, a weld timer, a robot, an appliance such as a washer, a dryer, a dishwasher, an air conditioner, a microwave, and/or an electronic device such as a light bulb.

At least one device population 10 may be comprised of one or more devices which are related by predetermined criteria. The predetermined criteria defining the device population may include one or more elements of identifying information, which may be provided by the device as device related content. For example, the device population 10 shown in FIG. 1 may be comprised of devices $10A \ldots 10n$, where each device $10x$ is similar to another device $10x$, for example, each device $10x$ is of the same make, model and manufacturer, to comprise a population of similar devices. Each of the devices $10x$ may be operating in a different location or environment, such that aggregating the device profiles $12A \ldots 12n$ may provide a statistically significant population profile 12 from which statistical descriptors, predictions, and estimations may be determined.

Figure 4A:
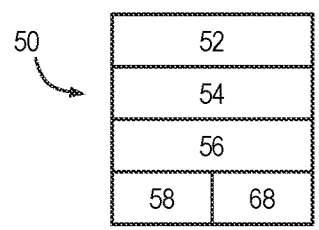
FIG. 4A is a schematic illustration of a data capture member configurable to provide behavior profiles to the system of FIG. 1.
Figure 4B:
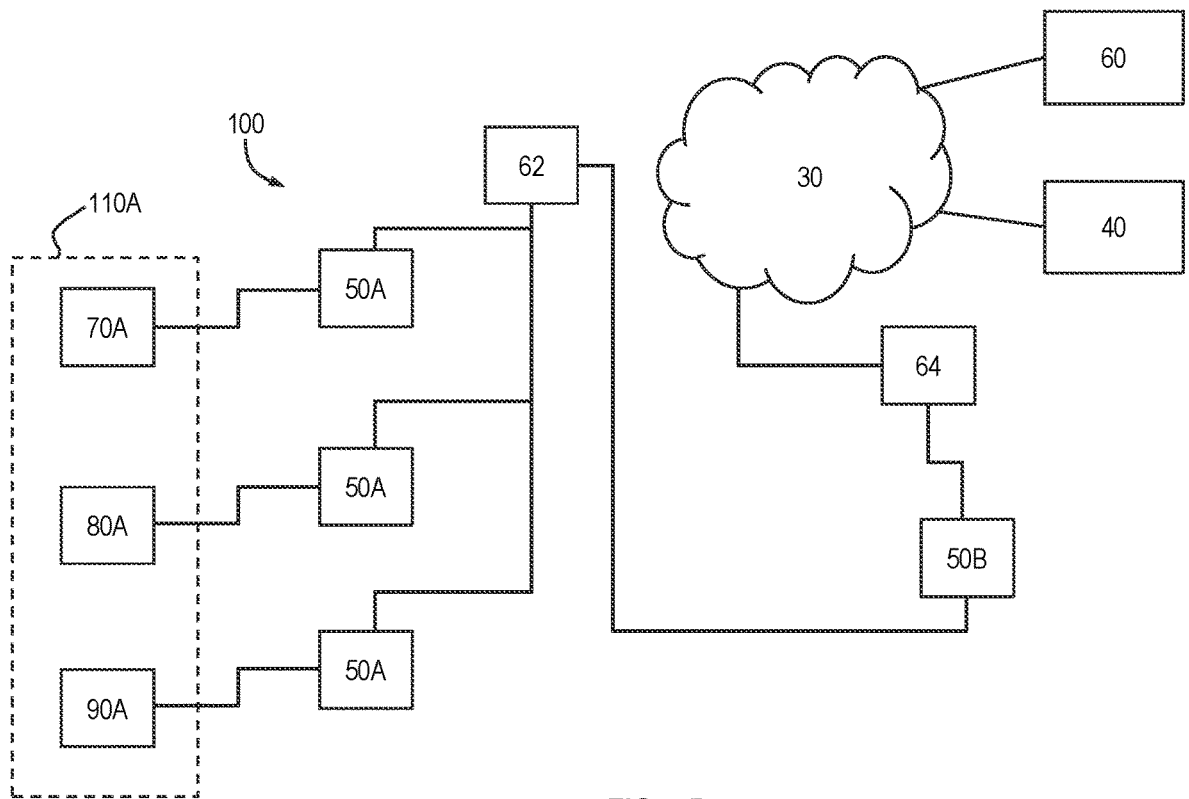
FIG. 4B is a schematic illustration of a system for generating behavior profiles including a location population profile defined by co-located device members of the internet-based device network of FIG. 1 and providing location population-related content.

Another device population 10 may be comprised of devices $70A \ldots 70n$, including the device 70A shown in FIG. 4B, where each device $70x$ is similar to another device $70x$, but dissimilar from a device $10x$ by differing in at least one of type, make, model and/or manufacturer or other identifying characteristic. The term "dissimilar" is used hereinafter to distinguish between two devices which differ in at least one identifying characteristic, where an identifying characteristic may be a type, make, model, manufacturer, function, application, operating environment, configuration or other identifying characteristic. In one example, the devices $10x$ and $70x$ may be comparable devices, e.g., the device $10x$ may be the same type of device as the device $70x$, but each may be of a different make, model, or manufacture, or differ in another identifying characteristic, such as the specific application or environment in which each device $10x$, $70x$ is used. The term "comparable" is used hereinafter to identify two devices which share at least one identifying characteristic, where an identifying characteristic may be a type, make, model, manufacturer, function, application, operating environment, configuration or other identifying characteristic. For example, a device $10x$ may be a clamping device of a first type, first model, and first manufacturer, such that the device population 10 is comprised of similar devices $10A \ldots 10n$. A device $70x$ may be a clamping device of the same type as a device $10x$ and differ in at least one other identifying criteria, such that each device $70x$ is similar to another devices $70x$, and each device $70x$ is comparable to but dissimilar from each device $10x$. For example, the device $70x$ may be the same first type and first model as device $10x$, but may be produced by a second manufacturer, such that the device population 70 is comprised of similar devices $70x$ having the same first type, first model, and second manufacturer. The devices $10x$ are dissimilar from the devices $70x$ based on differing manufacturers. The device population $10x$ may be compared with the device population $70x$ to provide a relative comparison of the first manufacturer's device $10x$ and the second manufacturer's device $70x$, for example, to provide a quality or performance ranking or comparison between the two populations, e.g., between the clamps of the first type and first model provided by the two different manufacturers.

The device profiles $10x$, $70x$ may be combined to form another population (not shown) comprising clamping devices of the first type and the first model from a variety of manufacturers to provide a population profile for first type/first model clamps, which may represent the norm, e.g., the expected behavior, of a first type/first model clamp. A device profile $10x$, $70x$ may be analyzed in comparison to the first type/first/model clamp population profile to determine, for example, if the device $10x$, $70x$ is performing within the norm of clamps of the first type/first model.

Any given device population 10 may be comprised of a plurality of devices where at least two of the devices are dissimilar and are related to each other by another identifying criterion, such as co-location. An example of such a location population 110A is illustrated in FIGS. 4B-6. The dissimilar devices 70A, 80A, 90A may be co-located, e.g., may share a location, where the term "location" is intended to be defined broadly herein. For example, a location 110A may be a welding machine, where the devices 70A, 80A, 90A may comprise the location population 110A, and the device 70A may be a clamp actuable to hold a work piece, the device 80A may be a welder configured to weld the work piece, and the device 90A may be a robot configured to position the work piece relative to the clamp 70A. The device profiles 72A, 82A, 92A may be defined by the power consumption pattern of each of these devices over time, such that the aggregated device profiles 72A, 82A, 92A define a location profile 112A, which may also be described herein as the "heartbeat" of the location 110A, e.g., a power consumption pattern defined by the device population 72A, 82A, 92A of the location 112A. The power consumption pattern for each device 70A, 80A, 90A may be collected, for example, by a PLC including a data transfer mechanism 20, where the PLC is controlling the machine 110A and each of the co-located devices 70A, 80A, 90A.

Figure 6:
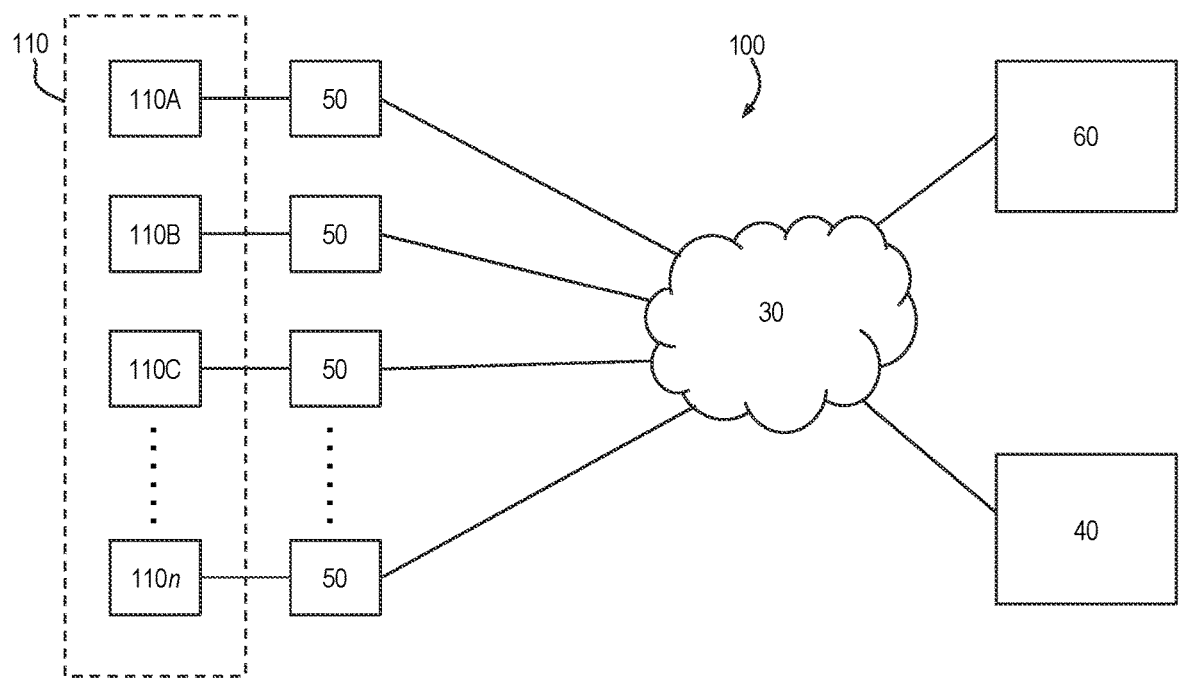
FIG. 6 is a schematic illustration of the system of FIG. 1 configured for generating behavior profiles including location population profiles defined by location and/or device members of the internet-based device network of FIG. 1 and providing location and/or device population-related content.

As shown in FIG. 6 and referring to the present example, a location population 110 may include a plurality of locations, e.g., welding machines $110A \ldots 110n$, each welding machine $110x$ comprising co-located dissimilar devices $70x$, $80x$ and $90x$, and defining a machine or location profile $112x$, also referred to as a heartbeat $112x$. The location profiles $112A \ldots 112n$ of the population of machines $110A \ldots 110n$ may be aggregated to define a location population profile (not shown), where the location population profile may define the normal or expected behavior pattern and/or normal or expected operational range of the locations (machines) $110A \ldots 110n$ relative to or as statistically derived from the location population 110. A location profile $112x$ may be compared to the location population profile to monitor the location $110x$, e.g., the particular machine $110A \ldots 110n$ corresponding to the location (machine) $110x$, for atypical or abnormal behavior as reflected in the location (machine) profile $110x$.

Figure 3:
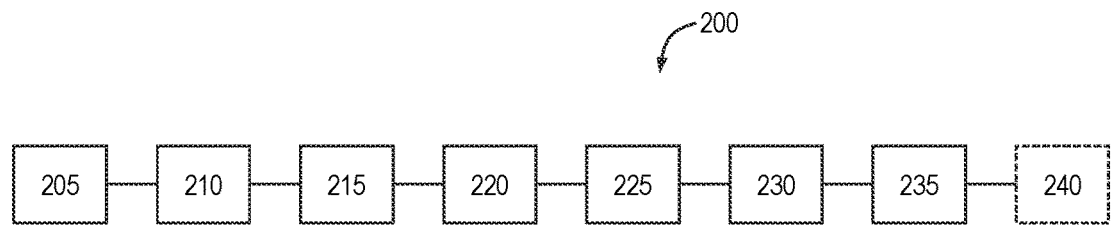
FIG. 3 is a schematic flow diagram of a process for generating a population behavior profile and related content for device members of a device network.

Referring to FIG. 3, shown generally indicated at 200 is an example process for generating and providing a population behavior profile and related content (not shown) for members of the device network 60. In a first illustrative example, the population profile may be a device population profile such as the population profile 12 shown in FIG. 2 and including the device profiles 12A . . . 12n defined by a device population 10 comprising devices 10A . . . 10n. In a non-limiting example, each of the devices 10A . . . 10n, e.g., each device 10x, may be configured as a clamp device of the same make, model and manufacturer performing a predetermined opening and closing cycle. Each of the devices 10A . . . 10n may be operating in a different location, which may be, for example, in different countries or regions such that the behavior data represented by the device profiles 12A . . . 12n of the devices 10A . . . 10n represent clamp opening and closing cycles from clamp devices operating in a variety of different environmental conditions.

The operation cycle behavior of each clamp may be captured by the data transfer mechanism 20 of FIG. 1, which may comprise a PLC controlling the opening and closing of the clamp device 10x. The device behavior profile 12x for a clamp device 10x may be generated by gathering at least one operation cycle behavior of the device 10x, and preferably gathering a sampling of multiple operation cycle behaviors over a period of time to develop a normal operation behavior profile 12x for each clamp device 10x, where a normal operation behavior profile 12x represents the actual routine or predictable behavior of the clamp device 10x in the device lox's operating environment, which may be influenced by factors such as the operating temperature, humidity, etc.

The process 200 begins at step 205 with providing a plurality of device behavior profiles 12A . . . 12 n, such as the device profiles shown in FIG. 2, to the content server 40. At step 210, each device profile 12x is stored on the content server 40 with identification information specific to each device 10x for which a device profile 12x is provided. At step 215, each device 10x and its profile 12x are associated or affiliated with at least one population, based on the device 10x identification information. In the present example, each of the devices 10x would be associated at least with the device population 10 by the content server 40 and/or the device network 60.

At step 220, the behavior profiles 12A . . . 12n of the clamp devices 10A . . . 10n comprising the population 10 are aggregated to generate a population profile 12 for the population 10. The population profile 12 represents the normal operation behavior profile and normal operation range of the clamp population 10, where the normal operation behavior profile may include a statistical representation of the expected behavior of a clamp 10x in the clamp population 10. As shown in FIG. 2, the population profile 12 may be quantified statistically by a statistical descriptor, such as a population average 14. The example of a population average as a statistical descriptor is non-limiting and other statistical descriptors 14, such as a mean or median of the population 10, may be generated. The population profile 12 may be quantified statistically be generating statistical limits 16, which may be control limits or other expressions of the statistical distribution of the population profile 12. In one example, the statistical limits 16 may be ±3 sigma or ±4 sigma limits, where sigma represents a standard deviation of the population profile 12. Aggregating the device profiles 12A . . . 12n may include generating statistical descriptors 14, 16 or other statistical descriptors of the population profile 12 comprising the device profiles 12A . . . 12n or otherwise quantifying the actual and/or predicted digital behavior of the population 10.

A "network effect" in economics and networks is generally described in Wikipedia (http://en.wikipedia.org/wiki/Network_effect). A digital data network effect can be created using the data which forms the digital footprint of certain physical actions or functions of electrically powered appliances and/or devices, such as the digital data provided by the device profiles 12A . . . 12n and the device population profile 12 to the content server 40 for aggregation, analysis and publication to the device network 60. For example, a clamp device 10x can open and close. This action can generate a data set that is the digital footprint for this action, and can be captured from the device 10x, for example, using a data transfer mechanism 20, and provided to the content server 40. This data set can include digital information such as when the motion starts, when the motion stops, and other data, depending on the configuration of the device, sensors in communication with the device, digital outputs from the device and related sensors, etc., comprising the digital voice of the device 10x. Other information or content related to the device 10x may be provided to the content server 40 and/or the device network 60. A population 10 may be defined by the content server 40 or via the device network 60 for a group of devices, such as the clamp devices 10x in operation at any specific time, such that the clamp devices 10x are identifiable by the content server 40 and/or device network 60 as members of the population 10 group.

Each of the devices 10x affiliated with the population 10, e.g., each member device 10x, generates a continuous flow of digital data as long as the clamp device 10x is in operation, which is provided via the data transfer mechanism 20 to the content server 40 and/or device network 60. Each of these data sets by itself, e.g., each device profile 12x considered in isolation or independently, may have a minimal value, for example, by not representing a normal operation range of the population 10 comprising the device 10x and/or by not providing statistically significant data, as the term "statistically significant" is commonly understood. However, when the data sets, e.g., the device profiles 12A . . . 12n are correlated together with metadata, such as device 10x identifiers which may include the clamp make, model, operating location and operating environment variables which may include ambient operating parameters such as temperature and humidity, warranty and service information, etc., the statistically significant quantity of data provided by the devices 10A . . . 10n can be compiled, analyzed and otherwise used to generate useful behavior knowledge about the clamp device population 10 or a subset thereof, such as how a certain type or model of clamp device 10x should behave according to a norm, e.g., a normal operation behavior pattern, defined by the device population 10. As described for FIG. 2, the normal or predicted behavior of a clamp device 10x may be expressed or quantified using statistical descriptors defined by the aggregated device profiles 12A . . . 12n and population profile 10, which may include at least one population estimator 14 and/or population distribution estimators or control limits 16, and may identify a normal behavior pattern and/or normal operational range of the device population 10. The "network effect" provided by the system 100 and method 200 described herein enables the capability to accumulate, aggregate, analyze and publish a statistically significant quantity of data representative of a networked group, e.g., a population 10, such that statistical modeling, predictions and comparisons related to the population 10 or member devices 10A . . . 10n may be made with high statistical confidence.

Still referring to FIG. 3, at step 225, the device profiles, population profiles, and device-related and population-related content of a clamp device 10x and/or clamp population 10 may be analyzed, to evaluate and/or monitor the status or condition of a clamp device 10x comprising the population 10, the status or condition of the population 10, etc. The analysis at step 225 may include comparing the clamp population 10 to another population, such as a clamp population comprising a clamp device 70x (see FIGS. 4B-5) which may be similar to the clamp device 10x, but of a different make, model, or manufacturer, such that comparative evaluation of the two populations of clamps 10x, 70x may be provided, which may include determining relative durability, quality, and/or satisfaction of the compared populations.

The analysis step 225 may include comparing a clamp device profile 12x with its population profile 12, to evaluate and/or monitor deviations of the individual clamp 10x against its population norm, e.g., the population profile 12. The analysis step 225 may include predicting future or impending behavior of the clamp 10x by identifying atypical behavior of the clamp 10x based on analysis of the clamp device profile 12x. Atypical behavior may include, for example, a device profile 12x at least partially outside limits 16 of the population profile 12, or trending of data comprising the device profile 12x indicating the device profile 12x will be moving outside the limits 16 of the population profile 12. For example, FIG. 2 shows a device profile 12A including at least one atypical or abnormal data point 18 outside of the control limits 16 such that the device profile 12A is atypical or abnormal in comparison with the population profile 12, which may provide a statistical conclusion that the device 10A defining the device profile 12A is behaving outside the normal behavior pattern or normal range of the population 10, which may warrant investigation. Using knowledge accumulated by and from the content server 40 and/or the device network 60, a prognosis and/or diagnosis of the atypical behavior of the device 12A may be provided. The ability to provide valuable information by correlating massive, e.g., statistically significant, amounts of similar data sets, e.g., data sets for a plurality of devices 10A . . . 10n comprising a device population 10, is characteristic of the data network effect described herein for populations of electrically powered industrial devices or appliances.

Continuing with the process 200 shown in FIG. 3, at step 230 the device and device population information received, affiliated, aggregated, analyzed and/or generated in steps 205 through 225, and any additional related content received or generated related to the device 10x, other devices 10A . . . 10n, and/or the population 10 is stored in the content server 40, for example, in one or more of the databases 42, 44, 46, all of which are shown in FIG. 1.

At step 235 the accumulated data, data analysis, related content, and/or analysis results including population norms, comparisons, ratings, etc. may be provided by the content server 40 to the device network 60 for accessing by the device members or other users of the device network 60. The content server 40 may include a publisher 48 configured to publish the accumulated data and information to the device network 60.

At an optional step 240, the content server 40 and/or device network 60 may provide messaging to a device 10x or other member of the device network 60. The messaging may include a status update indicating the status of the member device 10x relative to the member's group, e.g., the device population 10, which may be based on the analysis performed at step 225, and/or a status update for the device population 10, which may be provided directly to the member device 10x, to a user of the member device 10x, or may be provided for access via the device network 60. The messaging may be configured as an alert indicating abnormal behavior has been detected, a recommendation to investigate the operating condition of a device 10x, a comparative rating or ranking of a device or device population, and/or a prediction or estimation such as a quality or reliability estimate, etc. The messaging may be configured as an update that content has been added to the device network 60 related to the device 10x or population 10, where the related content may include, by non-limiting example, diagnostic and/or service information, investigation feedback, a Wall-post, a Tweet, device user or customer comments, device manufacturer information, etc.

Figure 5:
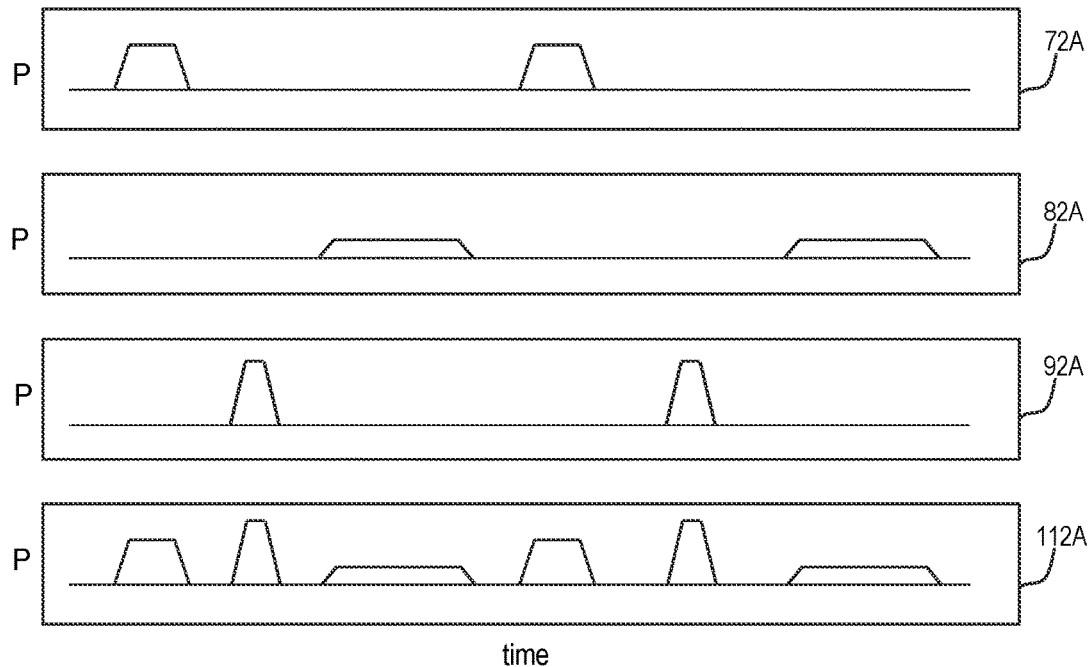
FIG. 5 is a schematic illustration of device behavior profiles provided by co-located device members of the location of FIG. 4B, and a location behavior profile generated by the system of FIG. 4B.

Referring now to FIG. 4A, shown is a schematic illustration of a data transfer member generally indicated at 50 and configurable as a data transfer mechanism 20 (see FIG. 1) to provide behavior data defining a device profile, such as the device profile 72A shown in FIG. 5, from a device, such as the device 70A shown in FIG. 4B in communication with the data transfer member 50, to the content server 40. The data transfer member 50 may be configured to capture a power consumption pattern of the device 70A in communication with the member 50, where the power consumption pattern defines the device profile 72A of the device 70A. As shown in FIG. 5, the power consumption pattern or profile 72A records the power P, which may be measured for example in amperes or voltage, consumed by the device 70A over a period of time. The period of time may be a predetermined time period identified for a location population 110A including the device 70A, a period of time defined by an operating cycle of the device 70A, or a period of time defined by an operating cycle of the location population 110A including the device 70A.

As previously described herein, the device 70A may be a member of a location population 110A illustrated in FIGS. 4B-6 and comprised of a plurality of devices where at least two of the devices are dissimilar and are related to each other by another criterion, such as co-location, such that the power consumption pattern of each of the co-located devices may be captured by a data transfer member 50 and aggregated to define a location profile 112A of the co-located group of devices. For example, a location 110A may be a welding machine, where the devices 70A, 80A, 90A may be co-located to define the welding machine 110A, e.g., to comprise the location population 110A. In a non-limiting example, the device 70A may be a clamp actuable to hold a work piece, the device 80A may be a welder configured to weld the work piece, and the device 90A may be a robot configured to position the work piece relative to the clamp 70A. The device profiles 72A, 82A, 92A may be defined by the power consumption pattern of each of these devices over a time period, such that the device profiles 72A, 82A, 92A may be aggregated, as shown in FIG. 5, to define a location population profile 112A, which may be referred to as a location profile 112A. The location profile 112A may also be described herein as the "heartbeat" of the device population 110A, e.g., an aggregate power consumption pattern of the location 110A defined by power consumption patterns of the device population 70A, 80A, 90A. The power consumption pattern for each device 70A, 80A, 90A may be collected, for example, by a data transfer member 50A, which may be referred to herein as a slave member 50A in communication with each of the co-located devices 70A, 80A, 90A and in communication with a data transfer member 50B, which may be referred to herein as a master member 50B.

Referring again to FIG. 4A, the data transfer member 50 may be configured as a data transfer mechanism 20 (see FIG. 1). The data transfer member 50, which may be configured as a power consumption monitor, may be referred to herein as a myPlug™ member 50. The data transfer member 50 may be configurable as a slave member 50A and/or a master member 50B, or may be configured to concurrently function as a slave member 50A and master member 50B. In one example, the myPlug™ member 50 may include a selector (not shown) such as a dip switch, selectable to configure the myPlug member 50 as one of a slave member 50A or a master member 50B. The myPlug™ member 50 may include a first interface 58 configured to operatively connect the member 50 to at least one of a network interface 64 and a device, such as a device 70A, 80A, 90A shown in FIG. 4B. The myPlug™ member 50 may include a second interface 68 configured to operatively connect the member 50 to a power source 62, which may be a power line providing electrical power to the location 110A, and the devices 70A, 80A, 90A included therein. By example, the second interface 68 may be configured to plug into a power outlet connected to the power source 62 such that when the member 50 is configured or installed as a slave member 50A, the power consumed by a device operatively connected to the interface 58 is provided from the power outlet to the device through the interface 68 and the slave member 50A.

The myPlug™ member 50 is a smart device including a central processing unit (CPU) 52, a memory 54, and a network interface 56. The interface port 56 may be a port configured to receive a network interface card (NIC), to enable communication, including wireless communication, between a member 50 configured as a slave member 50A and a member 50 configured as a master member 50B, as shown in FIG. 4B, wherein the term member 50 may refer to a slave member 50A, a master member 50B, or collectively to slave and master members 50A, 50B. The CPU 52 and memory 54 are configured to capture the power usage pattern of any device to which the member 50 passes power. In the example shown in FIG. 4B, a slave member 50A is connected to each of the devices 70A, 80A, 90A, to capture data defining the power usage pattern of each respective device. The slave member 50A then transmits the captured data through a network to the master member 50B. The master member 50B is operatively connected to a network interface 64, which may be, for example, a network router, and is configured to transfer the transmitted data to the content server 40 for storage, affiliation, aggregation and/or analysis by the content server 40.

As was described herein related to FIG. 1, and shown in FIG. 5, the device profiles 72A, 82A, 92A may be defined by the transmitted data, e.g., the power consumption patterns of the respective devices 70A, 80A, 90A, and aggregated to provide a device population profile 112A, which may be referred to as a location profile corresponding to the population of devices 70A, 80A, 90A co-located at the location 110A. The content server 40 may publish the transmitted data, including device profiles such as device profiles 72A, 82A, 92A shown in FIG. 5, and device population profiles such as the population profile 112A, to the device network 60 for access by the device members, location member, or other users of the device network 60, which may include, for example, a customer, supplier, manufacturer, operator, and/or service provider of the welding machine 110A and/or co-located members 70A, 80A, 90A.

In one example, the slave members 50A can be connected with the master member 50B using the power line providing power from a shared power source 62 to the location 110A and devices 70A, 80A, 90A co-located therein, and through the plurality of slave members 50A and the master member 50B, via the Ethernet over power. Each of the members 50 may have a unique ID, such as a MAC address, by which each slave member 50A and the data transmitted via the slave member 50A may be identified and associated to the device in communication with and/or receiving power through the slave member 50A. The master member 50B may have a unique ID, such as a MAC address, to identify and associate data transmitted via the master member 50B with the location or device population 110A.

In another example, the slave members 50A and master member 50B may be configured for wireless connection with each other, such as WIFI, Bluetooth or other wireless means, so that the power consumption data collected by each slave member 50A may be wirelessly transmitted to the master member 50B. The master member 50B may be configured for wireless communication with the network interface 64 for wireless transmission of the profile data defined by the location 110A to the content server 40. In another example, the content server 40 may be co-located with the location 110A and the master member 50B may be in direct communication with the content server 40.

Referring to FIG. 5, the device profiles 72A, 82A, 92A may be collected over the same time period and provided to the content server 40 and/or the device network 60, where each device profile represents the power consumption pattern of that respective device during the same time prior. The device profiles 72A, 82A, 92A may be aggregated by the content server 40 to define a device population profile 112A reflecting the consolidated power consumption pattern of the co-located devices 70A, 80A, 90A. The device and population profiles 72A, 82A, 92, 110A and related content, which may include, as describe previously, identifying information for each of the devices and the location, information regarding the operating environment of the devices and/or location, or other information may be published by the content server 40 for access, for example, through the device network 60. In the present example, the location 110A is configured as a welding machine, and the identifying information may include the type, model, make, manufacturer, time in service, operating environment, etc. of the welding machine 110A. Related information may include identifying information regarding the power source 62.

As shown in FIG. 6, and similar to the system and process described related to FIGS. 1-3, the location or device population 110A may be a member of a group of locations 110 including the location 110A and locations 110B . . . 110$n$, where the group of locations 110 may be referred to as a location population. In the present example, each of the locations 110A . . . 110$n$ may be a welding machine 110$x$ of the same type, make, model and manufacture, and respectively including devices of the same type, make, model and manufacture as the devices 70A, 80A, 90A of the welding machine 110A. Each welding machine 110$x$ may be operating in a different environment or location. For example, each of the welding machines 110A . . . 110$n$ may be operating in a different manufacturing facility, where the different manufacturing facilities are geographically dispersed.

As described herein for devices 10A . . . 10$n$, the location profiles 112$x$ provided by each of the locations (welding machines) 110$x$ may be provided to the content server 40 and/or device network 60 and aggregated to develop a location population profile 112 (not shown). The location population profile 112 may define statistical descriptors defined by the location population profile 112 to which the location profile 112x may be compared, such that the content server 40 and/or the device network 60 may be used to identify atypical behavior of a location (welding machine) 110x and may provide a message to the location 110x and/or a location 110x user to notify them of the atypical behavior. The statistical descriptors may define a normal behavior pattern and/or normal operational range for the location population 110. As described previously, the message may provide a recommendation to investigate the atypical behavior, diagnostic, prediction and/or service information, or other information.

In one example, a myPlug™ member 50 may be configured as a power regulator to be switched on and off and thus control power flow to a device or location connected to the member. The content server 40 and/or the device network 60 may be configured to provide a message to the member 50 to actuate the power regulator. For example, atypical behavior of a location 110x may be determined during the analysis step 225 of the process 200 applied to the location population 110. The content server 40 may be configured to provide a message to the master member 50B to actuate the power regulator to cease operation of the location 110x, e.g., to shut down the welding machine 110x, or to cease operation of a device 70x, 80x, 90x co-located at the location 110x, to prevent a predicted condition or behavior.

Other configurations of the system and method described herein are possible, and the examples provided herein are not intended to be limiting. For example, a co-located device population, such as a location population 110x, may be comprised of a plurality of devices co-located within a dwelling or household. An example of such a co-located device population 110x may include a set of appliances operating in a household including a refrigerator, a dishwasher, a garage door motor, a furnace, and a microwave. The respective device profile of each of these appliances may be defined by the power consumption pattern of each appliance over time, such that the aggregated appliance profiles of the appliances define a location profile 112x, also described herein as the "heartbeat" of the location 110x, e.g., the heartbeat of the household 110x. The power consumption pattern for each of the household appliances may be collected, for example, by a myPlug™ member 50 in communication with each appliance and the power line in the dwelling. The "heartbeat" or location profile 112x may be collected for a sufficient period of time to define a normal or baseline power consumption pattern, e.g., a normal "heartbeat" for the household 110x. The location profile 112x may be monitored over time, e.g., on an ongoing basis, and compared with the normal or baseline location profile 112x to detect abnormal or atypical patterns of power consumption, which may be used to identify, for example, a condition requiring attention or indicating a potential failure, such as increased current draw of a deteriorating motor used by one of the appliances in the household 110x. By providing a means of identifying an abnormal pattern, preventive actions may be taken to avoid user convenience, for example, due to a failure of a furnace, refrigerator, or other electrical appliance. Abnormal or atypical patterns of power consumption may also indicate, for example, unauthorized use of the appliances, as may occur during a home intrusion, for which an alert or warning may be provided.

In another example, a co-located population of devices 110x may comprise computer and computer-related devices, which may include personal computers, laptops, printers, routers, or other computer peripheral devices, networked to each other within a location, which may be a household or other facility, such as a business. A "heartbeat" or location profile 112x may be collected for a sufficient period of time to define a normal or baseline power consumption pattern for the location population 110x. Ongoing monitoring of the location profile 112x, e.g., ongoing monitoring of the power consumption patterns for the population 110x, and comparing of the location profile 112x over time with the normal or baseline profile 112x may be performed to detect abnormal power consumption by one or more of the computers or computer-related devices comprising the location population 110x. Abnormal or atypical power usage may indicate unauthorized use of one of the devices comprising the location population 110x, which may be the result of an intrusion of the location population 110x or a device member thereof, which may be an intrusion occurring at the location or by remote access to the location, including an intrusion, for example, by a Trojan, other virus, or bot, for which a warning or alert could be provided to the household, e.g., to the operator or owner of the computer devices comprising the population 110x. In this way, the system 100 may be configured as an intrusion detection system.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A system comprising a content server in communication with a plurality of devices, wherein the content server comprises a processor and a memory and is configured to:
   communicate with the plurality of devices;
   receive digital behavior data and device identifying information from one or more respective devices of the plurality of devices;
   associate the digital behavior data and the device identifying information received from the respective device with the respective device;
   wherein the digital behavior is originated by the respective device over a period of time that includes sampling of digital behavior data of a plurality of operation cycles of the respective devices;
   generate a device profile for the respective device defined by the digital behavior data associated with the respective device;
   identify a plurality of device populations, wherein each respective device population is defined by at least one respective element of the device identifying information; populate the respective device population with one or more respective devices associated with the at least one respective element of the device identifying information;
   generate a population profile for the respective device population defined by the digital behavior data of the respective devices populating the respective device population; and
   store the device profiles and the population profiles;
   wherein the content server is configured to receive and provide content related to at least one of the device profiles and the population profiles;
   wherein the content server is:
   in communication with a device network;
   configured to provide the device profiles and the population profiles to the device network;
   configured to generate a message associated with at least one of the device profiles and the population profiles; and configured to provide the message to at least one of the device network and one or more devices of the plurality of devices.

2. The system of claim 1, further comprising:
a data transfer mechanism in communication with the respective device and the content server, wherein the data transfer mechanism is configured to control behavior of the respective device and to transmit the digital behavior data from the respective device to the content server.

3. The system of claim 1, wherein the population profile of each respective device population defines at least one of a statistically normal behavior pattern and a statistically normal operational range of the respective device population.

4. The system of claim 1, wherein:
the plurality of device populations includes a first device population defining a first population profile, and a second device population defining a second population profile; and
the content server is configured to compare the first population profile to the second population profile.

5. The system of claim 1, wherein the content server is configured to compare at least one device profile to at least one population profile to determine whether the at least one device exhibits abnormal digital behavior in comparison to the at least one population profile.

6. A method comprising:
receiving digital behavior data and device identifying information from one or more respective devices of a plurality of devices in communication with a content server;
the content server comprising a processor and a memory;
wherein the digital behavior data is originated by the respective device over a period of time and includes sampling of digital behavior data of a plurality of operation cycles of the respective device;
associating the digital behavior data and the device identifying information received from the respective device with the respective device;
generating a device profile for the respective device defined by the digital behavior data associated with the respective device;
identifying a plurality of device populations, wherein each respective device population of the plurality of device populations is defined by at least one respective element of the device identifying information;
populating each respective device population with one or more respective devices associated with the at least one respective element of the device identifying information;
generating a respective population profile for each respective device population defined by the digital behavior data of the respective devices populating the respective device population;
storing the respective device profiles and the respective population profiles using the content server;
wherein the content server is configured to be in communication with a device network and to provide the respective device profiles and the respective population profiles to the device network;
generating a message associated with at least one of the respective device profiles and the respective population profiles; and
providing the message to at least one of the device network and one or more devices of the plurality of devices.

7. The method of claim 6, further comprising:
analyzing the respective device profile in comparison to at least one population profile with which the respective device profile is associated to determine whether the respective device defining the respective device profile exhibits abnormal digital behavior in comparison to the at least one population profile; and
generating an alert related to at least one of the respective device and a user of the respective device when abnormal digital behavior of the respective device is determined.

8. The method of claim 7, wherein the abnormality is related to an intrusion of the one of the device and the population defining the profile.

* * * * *